United States Patent [19]

Jenkins

[11] 4,089,453
[45] May 16, 1978

[54] SOLDERED TUBE END

[75] Inventor: William Bernard Jenkins, Henrico County, Va.

[73] Assignee: Reynolds Metals Company, Richmond, Va.

[21] Appl. No.: 681,908

[22] Filed: Apr. 30, 1976

[51] Int. Cl.² .................................................. B23K 1/18
[52] U.S. Cl. .................................. 228/154; 228/173 A; 228/254
[58] Field of Search ............... 228/132, 154, 189, 254, 228/173

[56] References Cited

U.S. PATENT DOCUMENTS

| 3,602,978 | 9/1971 | Oaks ................................ 228/189 X |
| 3,633,266 | 1/1972 | Taylor ................................ 228/173 |
| 3,971,500 | 7/1976 | Kushner et al. .................. 228/254 X |

FOREIGN PATENT DOCUMENTS 266,317  10/1913  Austria ................................ 228/154

Primary Examiner—Al Lawrence Smith
Assistant Examiner—James G. Smith
Attorney, Agent, or Firm—Glenn, Lyne, Gibbs & Clark

[57] ABSTRACT

An initially loose fitting aluminum sleeve is pre-tinned with fluxless solder and, while the solder is molten, is swaged down and rotated to form a tight soldered joint connecting two aluminum tube ends, or an aluminum tube end to a copper tube end.

8 Claims, 4 Drawing Figures

SOLDERED TUBE END

BACKGROUND OF THE INVENTION

In the art of joining the ends of metal tubes together, particularly if one or both of the tubes are of an aluminum base alloy, it has been known to provide a solid coating of fluxless solder on a surface of at least one of two tubular elements to be joined together and, after heating the solder to its melting point, to slide the tubular elements aganist each other to disturb to oxide coating normally present on aluminum and thereby facilitate the bonding of the solder to metallic aluminum beneath the oxide layer. However, the necessary sliding fit complicates the operation and requires the expense of manufacturing to close tolerances.

It has also been known to connect tube ends by enlarging one to fit over the other, or by soldering each to a connecting sleeve fitting over both.

SUMMARY

In accordance with the present invention, the tubular ends can readily be connected by a tight soldered joint without providing any close fitting parts, whether the ends are joined directly or through a sleeve, but preferably using a sleeve. At least one of the surfaces to be soldered together is pre-soldered, preferably with a fluxless solder, but only a loose fit need be used between the surfaces. After the pre-soldered surface or surfaces have been heated to melt the solder, the part having the larger diameter is simultaneously swaged down and moved relative to the other part (lengthwise or rotationally) until a tight soldered joint has been formed. This is preferably done by sliding a pre-soldered loose-fitting sleeve over the opposed ends of the two tubular members to be joined, which need not be presoldered, and after applying heat to melt the solder and while continuing to keep it melted, swaging down and shifting the sleeve relative to both of the tubular ends simultaneously, without moving either of the tubular ends during this operation.

DRAWINGS

The accompanying drawings show, for purposes of illustration only, present preferred embodiments of the invention, in which.

DESCRIPTION

Figure 1:
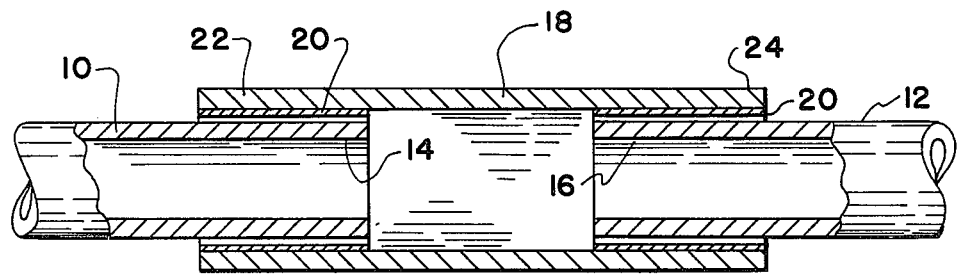
FIG. 1 is a diagrammatic cross-sectional view taken along the axis of a pair of tube ends with a sleeve positioned over the gap between them, the sleeve being precoated with solder in accordance with the invention.

Referring now more particularly to the drawing, and initially to FIG. 1, there is illustrated a pair of tubes 10 and 12 in aligned end-to-end relation, with their respective ends 14 and 16 facing each other. Although the ends 14 and 16 are illustrated as being spaced, they could be abutting.

A sleeve 18 extends loosely around the ends 14 and 16 and across the joint between them, to join the two tubes 10 and 12. At least the outer ends 22 and 24 of the inner surface of sleeve 18 are precoated with solder 20, suitable for fluxless soldering of aluminum-base alloys. When joining parts of aluminum-base alloys or copper-base alloys, whether aluminum to aluminum or aluminum to copper, the present preferred solder is 95% zinc and 5% aluminum. Another solder example is a zinc base solder comprising about 2 to 5 percent aluminum, up to about 5 percent copper, and up to about 1 percent magnesium by weight, such as the solder sold under the trade name of Ney 380 manufactured by Ney Metals, Inc., of Brooklyn, N.Y., comprising 90% zinc, 5% aluminum, 4.9% copper and 0.1% magnesium, balance aluminum.

The sleeve 18 is placed over one of the tubes 10 or 12 before the tubes are moved to the position shown in the drawing, and then the sleeve 18 is moved lengthwise until its ends 22 and 24 overlap both of the tube ends 14 and 16. The sleeve is preferably made to fit loosely over the tube ends 14 and 16, thus facilitating the operation and avoiding the cost of producing the sleeve and tube ends to fine tolerances.

When the parts are thus assembled, at least the ends 22 and 24 of sleeve 18 are swaged down to reduce their diameter. Heat is applied to the sleeve ends so that the solder coating 20 is molten during swaging. The tube ends 14 and 16 are preferably preheated to assist in melting the solder. Such melting temperature is maintained as the swaging action brings the inner solder-bearing surfaces of the sleeve ends 22 and 24 against the outside of the tubular ends 14 and 16, and simultaneously sleeve 18 is moved relative to the tube ends 14 and 16, preferably rotationally, but possibly longitudinally, to disturb the naturally-occurring oxide coating around the outside of the tube ends 14 and 16. This ensures that the solder will bond to the metallic aluminum beneath the oxide coating. The result is a tight soldered joint between the tube ends 14 and 16.

Figure 2:
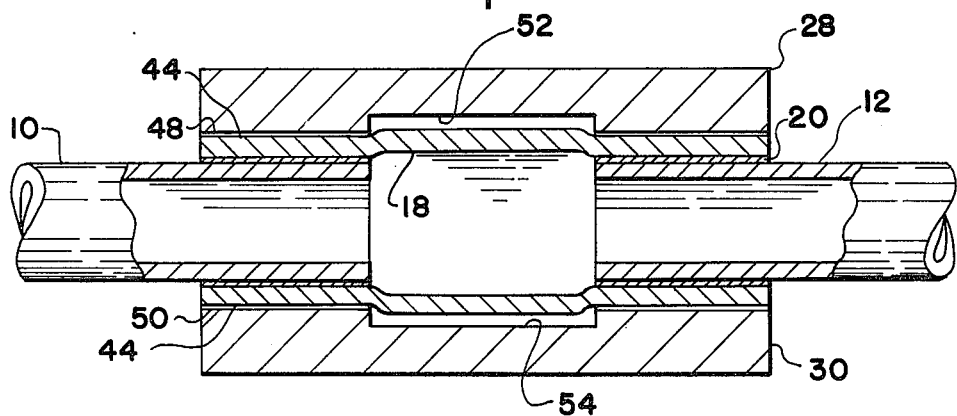
FIG. 2 shows a diagrammatic cross-sectional view corresponding to FIG. 1, except that a pair of swage blocks of the invention are also shown after swaging down and soldering the sleeve to the tube ends in accordance with the invention.
Figure 3:
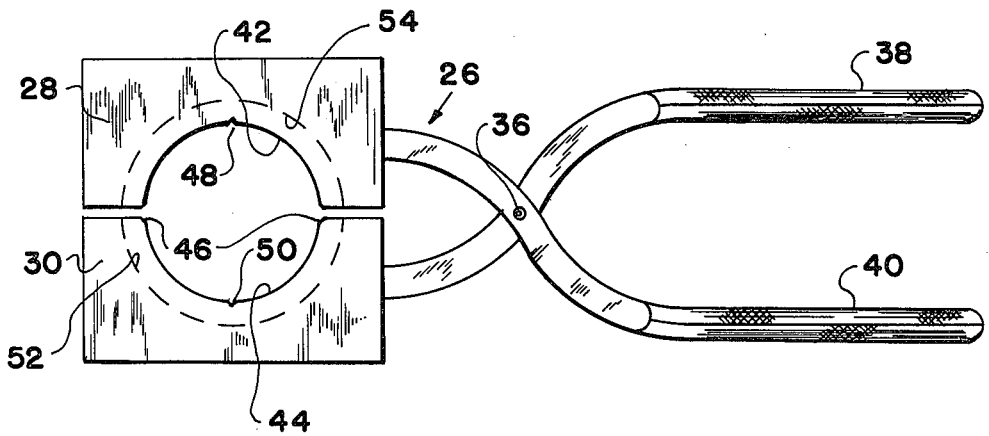
FIG. 3 shows diagrammatically the swaging tool of which the swage blocks are shown in FIG. 2, viewed endwise relative to FIG. 2 but omitting the tube ends and sleeve assembly and showing the swage blocks spaced slightly apart.
Figure 4:
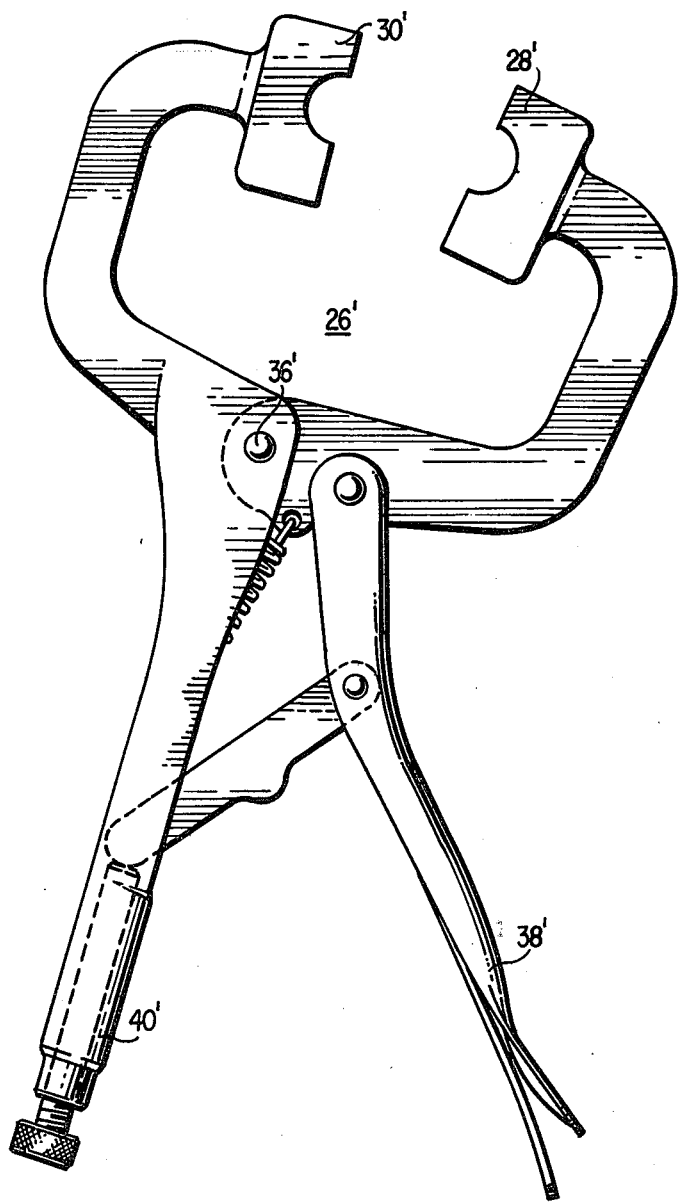
FIG. 4 corresponds in larger scale to FIG. 3 but shows details of a present preferred tool of the invention.

The above-described swaging action is preferably accomplished by means of the swaging tool 26 illustrated in FIGS. 2 and 3. Tool 26 comprises a pair of blocks 28 and 30 respectively mounted on the ends of a pair of elongated elements pivoted on a pin 36 operated by handles 38 and 40 in the manner of a pair of pliers. Although this simple form of actuation is illustrated for convenience, it is preferable to use an adjustable toggle to give better leverage for gripping, such as exemplified in the well-known form of locking pliers sold under the trademark "Vise Grip". (FIG. 4) Opposed semi-cylindrical die faces 42 and 44 respectively formed in the blocks 28 and 30 are pressed toward each other when the handles 38 and 40 are pressed toward each other. The die faces 42 and 44 are chamfered at their side edges, as shown at 46 in FIG. 3, and respectively have longitudinal grooves 48 and 50 midway around each die face, in order to provide small spaces for flow of metal from the outside of sleeve 18 when the blocks 28 and 30 are pressed together. The metal of sleeve 18 in these spaces helps to prevent rotary slippage of the blocks 28 and 30 relative to sleeve 18, especially if the outside as well as the inside of sleeve 18 is precoated with solder. The die faces 42 and 44 could extend straight across between the opposite ends of blocks 28 and 30, which would result in swaging down the whole length of sleeve 18, as might be preferred when joining abutting tube ends. However, swaging effort is reduced by relieving the middle portions 52 and 54 of the respective die faces 42 and 44 when joining spaced tube ends, so that only the ends 22 and 24 of the sleeve 18 are swaged down, as shown in the drawing. Electrical heater elements (not shown) can be mounted in the blocks 28 and 30 for internally heating the blocks 28 and 30 and thus also the sleeve ends 22 and 24.

The blocks 28 and 30 are preferably bored out to form the die faces 42 and 44 while they are clamped against each other, to provide a bore having a diameter slightly smaller than the sum of the outside diameter of the tube ends 14 and 16 plus twice the thickness of the respective tube ends, and to make contact between the blocks act as a limit to control the degree of swaging action. Thus, when the blocks 28 and 30 are pressed together by the handles 38 and 40, a slight interference fit will be created between the inside of the sleeve ends 22 and 24 with the tube ends 14 and 16. The thickness of solder precoating 20 (including any solder which may be precoated around the outside of the sleeve 18) is considered negligible for determining the dimensions necessary to achieve the said interference fit, since the solder when molten is squeezed out until it has very little thickness between the parts being swaged down.

In a specific example of the practice of the invention, a coaxial cable was connected by first silver soldering together the two abutting copper tube ends constituting the inside element of the coaxial cable. The outside element of the cable to be joined were a pair of aluminum-base alloy tubes concentrically surrounding and radially spaced from the copper inner tube. In order to provide access to the abutting inside copper ends for such soldering, the outside tube ends had to be positioned about an inch (2.5 cm) apart. The outside tubes had an outside diameter of 0.410 inch (1.69 cm) and a wall thickness of 0.022 inch (0.559 mm) and were not precoated with solder or flux. An aluminum-based alloy sleeve was earlier precoated with 95% zince – 5% aluminum solder by complete submersion in a bath of molten solder while subjected to ultrasinic vibration to improve the bond. The sleeve precoated with solid solder was initially positioned around one of the outer tube ends away from the joint between them. After silver soldering the copper inner tube ends, a gas torch was used to preheat the spaced outer tube ends, the sleeve was slid over the joint between the aluminum ends to a position like that shown in FIG. 1, and the gas torch was applied to preheat the sleeve to the melting temperature of the solder. The swaging tool blocks, which had a die face bore of 0.423 inch (1.075 cm), were in the meanwhile preheated by the gas torch, and were clamped around the sleeve and pressure was exerted until the blocks came against the sleeve long enough to heat the tube ends to solder melting temperature and hard enough to tighten the sleeve around the tube ends. The swaging tool was then rotated several times back and forth through an arc of about 30°, carrying the sleeve with it, while the tube ends remained stationary. Then the blocks were pressed together until abutting each other, as shown diagrammatically in FIG. 2, thereby swaging down the sleeve until it had an interference fit with the spaced aluminum tube ends. The grip of the blocks was then released and the joint was ready for use. The swaging operation takes about a half a minute or less for tubes of this size.

Another example of the practice of the invention consists of joining two tube ends for use in a refrigeration system, one being of an aluminum base alloy and the other being of refrigerant grade copper, while in abutting relationship. The aluminum tube end had an outside diameter of 0.500 inch (1.27 cm), and a wall thickness of 0.037 inch (0.855 mm), while the copper tube had the same outside diameter and a wall thickness of 0.030 inch (0.693 mm). The tube ends were not precoated with solder or flux. The sleeve to form the joint was of aluminum base alloy and was about ⅞ inch long (2.22 cm), with a wall thickness of 0.050 inch (0.127 mm) and a die face bore of 0.525 inch (1.335 cm). The sleeve was entirely precoated with solder as in the previous example. The swaging and soldering operations were as described above, except that the joint differed from that diagrammatically illustrated in FIG. 2 in that the tube ends were abutting and the swaging blocks were not relieved in the middle, so that the sleeve was uniformally swaged down one end to the other.

The swage blocks used in the above-stated examples were of mild steel. However, stainless steel or other material less subject to reaction with the solder, would be preferable.

The temperatures of the blocks and joint assembly were determined by observing melting of the solder. When the solder is molten it is slippery between the sleeve and tube ends, and this is felt when the blocks and sleeve are rotated relative to the tube ends. In general, the temperature range of the region to be joined is preferably between the melting point of the solder (about 720° F) up to about 800° F.

Aluminum base alloys suitable for the purpose of the invention are electrical grade, 1200, 3003, and 6061, to name just a few examples. In general, any fluxless solerable aluminum base alloy can be joined in accordance with the invention. While the invention is not advantageous for joining copper tubes to copper tubes, because copper can more readily be soldered by other methods, it is advantageous for joining aluminum tubes to copper tubes, as in the above-stated example. Attention is also drawn to the fact that the invention is applicable to joining solid wires or bars, instead of tubes.

While present preferred embodiments of the invention and method of practicing the same have been illustrated and described, it will be understood that the invenion is not limited thereto but may be otherwise variously embodied and practiced within the scope of the following claims.

I claim:

1. A method of forming a tight soldered joint between a first hollow cylindrical member and a second cylindrical member, the first cylindrical member having an inner cylindrical surface loosely overlapping and coaxial with an outer cylindrical surface of the second cylindrical member, comprising the steps of precoating at least one of said surfaces with solder, heating the soldered surface to the melting temperature of the solder, and, while maintaining said melting temperature, simultaneously swaging down the said first cylindrical member to reduce the diameter thereof and bring its said inner surface into an interference fit with said outer surface of said second cylindrical member, and while performing said swaging operation simultaneously further moving one of said cylindrical members relative to the other to cause said surfaces to slide against each other, thereby tending to penetrate the surfaces to expose bare metal to the molten solder.

2. The method of claim 1, in which at least one of said metal members has its portion which forms its said cylindrical surface composed of an aluminum base alloy.

3. The method of claim 1, in which at least one of said metal members has its portion which forms its said cylindrical surface composed of a copper base alloy.

4. The method of claim 1 wherein the step of moving one of said members relative to the other during swaging is performed rotationally.

5. A method of connecting two aluminum pipe ends comprising the steps of precoating solder on the interior surface of a sleeve member, at least adjacent its two opposite ends, said sleeve having a loose fit relative to said pipe ends, maintaining the temperature of the sleeve and pipe ends high enough to melt the solder, and while the solder is melted, simultaneously swaging down at least the opposite ends of the sleeve until said sleeve ends grip said pipe ends in an interference fit, and during said swaging operation simultaneously rotating said sleeve relative to the pipe ends, thereby tending to rub through the naturally occurring oxide on the aluminum surfaces adjacent the solder to expose bare metal to the molten solder.

6. A method of joining two cylindrical members by means of a cylindrical sleeve having an inner cylindrical surface loosely overlapping outer cylindrical surfaces of both said cylindrical members, comprising the steps of precoating at least said inner surface or said outer surfaces with solder, heating the soldered surface to the melting temperature of the solder, and, while maintaining said melting temperature, simultaneously swaging down the cylindrical sleeve to reduce the diameter thereof and bring its said inner surface into an interference fit with said outer surfaces of said cylindrical members, and while performing said swaging operation, simultaneously further moving said sleeve relative to said cylindrical members to cause said surfaces to slide against each other, thereby tending to penetrate the surfaces to expose bare metal to the molten solder.

7. The method of claim 6 wherein said cylindrical members are tubes.

8. The method of claim 6 in which the surface of said cylindrical sleeve which is to overlap the outer surfaces of the cylindrical members is precoated with solder.

* * * * *